H. KEARNS & W. D. MARTIN.
MIRROR AND SHELF SUPPORTING FRAME.
APPLICATION FILED FEB. 28, 1914.
1,153,929.
Patented Sept. 21, 1915.
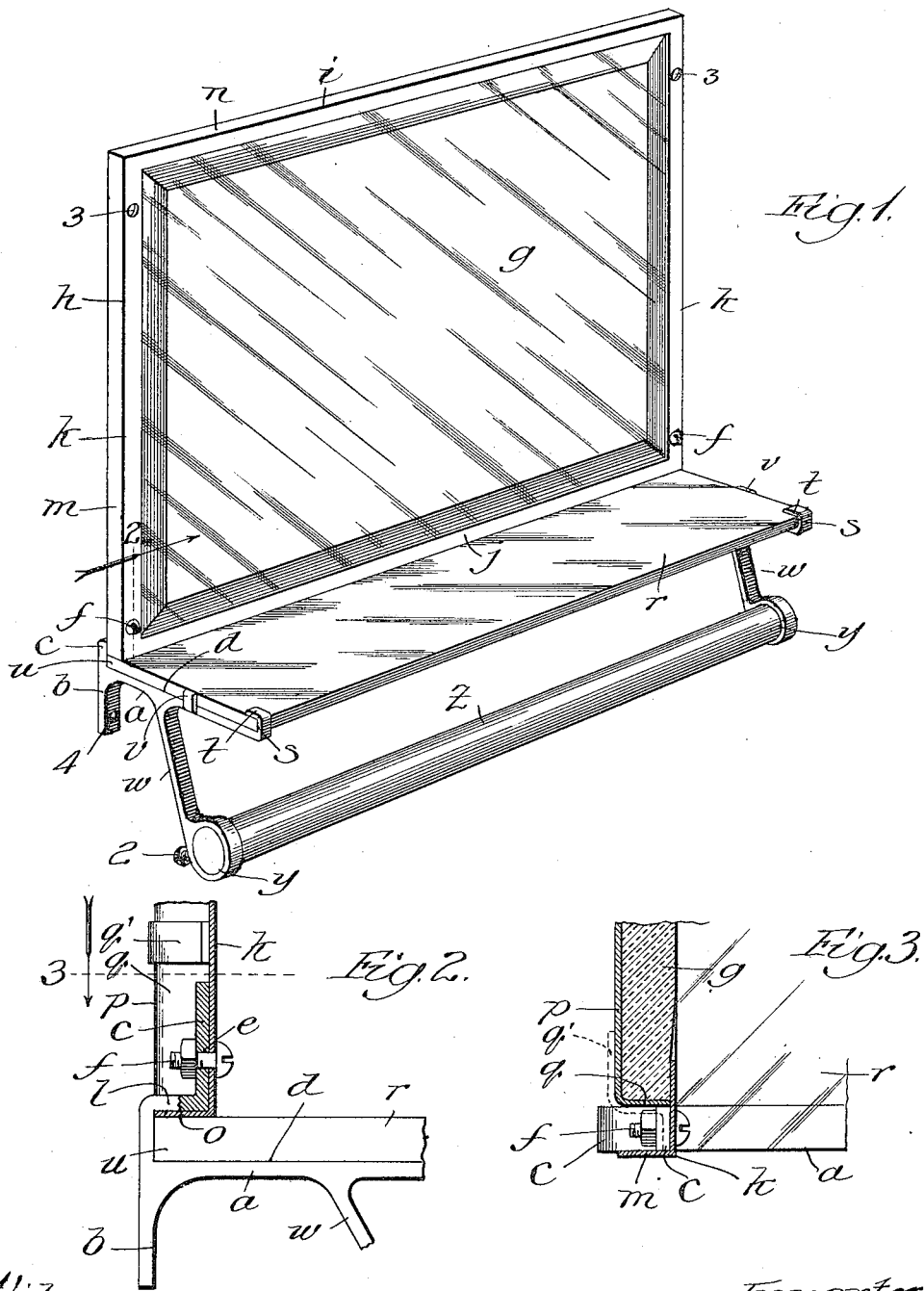

UNITED STATES PATENT OFFICE.

HELEN KEARNS AND WILLIAM D. MARTIN, OF CHICAGO, ILLINOIS, ASSIGNORS TO HELEN KEARNS AND WILLIAM J. KEARNS, BOTH OF CHICAGO, ILLINOIS, DOING BUSINESS UNDER THE FIRM-NAME OF W. J. KEARNS MIRROR COMPANY.

MIRROR AND SHELF SUPPORTING FRAME.

1,153,929.  Specification of Letters Patent.  Patented Sept. 21, 1915.

Application filed February 28, 1914. Serial No. 821,831.

*To all whom it may concern:*

Be it known that we, HELEN KEARNS and WILLIAM D. MARTIN, citizens of the United States, and residents of Chicago, in the county of Cook and State of Illinois, have invented certain new and useful Improvements in Mirror and Shelf Supporting Frames; and we do hereby declare that the following is a full, clear, and exact description thereof, reference being had to the accompanying drawings, and to the letters of reference marked thereon, which form a part of this specification.

This invention relates to mirror and shelf supporting frames.

The invention relates to that class of mirror and shelf supporting frames having shelf-supporting brackets connected with a mirror frame and adapted to be supported thereby.

The principal object of the invention is to provide a simple, economical and efficient mirror and shelf supporting frame.

A further object of the invention is to provide a mirror and shelf supporting and connecting frame adapted to enable a glass shelf to be securely held in position to project forward beyond the bottom edge of a mirror frame, all so constructed and arranged that the shelf and mirror frames are rigidly secured together so as to form a rigid structure throughout, without the use of bolts or other securing means extending through the glass shelf and without requiring apertures in the shelf in order to enable the parts to be rigidly secured together.

The invention consists in the features, combinations, and details of construction herein described and claimed.

In the accompanying drawings, Figure 1 is a perspective view of a mirror and shelf, and mirror and shelf supporting and connecting frame-work made in accordance with our invention and improvements; Fig. 2, an enlarged detail end view partly in section of a part of a mirror and shelf supporting frame, taken on line 2 of Fig. 1 looking in the direction of the arrow, and showing the upwardly projecting rear securing arm of one of the shelf-supporting bracket members in vertical section; and Fig. 3, an enlarged detail view in horizontal section, taken on line 3 of Fig. 2 looking downward.

In constructing a mirror and shelf, and mirror and shelf supporting frame in accordance with our invention and improvements, we provide a pair of bracket members, each comprising in its construction a horizontal forwardly projecting bracket arm $a$ having a rear depending arm portion $b$ and a rear upwardly projecting securing arm portion $c$ projecting above the top shelf-engaging surface portion $d$ of the horizontal arm. The upwardly projecting securing arm portions or members $c$ of the brackets are provided with suitable apertures $e$ for admitting bolts or screws $f$, or other suitable securing means adapted to enable the brackets to be secured to a mirror frame. In the form of the device shown in the drawings, a mirror $g$ is mounted in a metallic upright frame $h$, comprising a top frame portion $i$, a bottom frame portion $j$, and end frame portions $k$, all of which, when in the form shown in the drawings, are of metal. The bottom frame portion $j$ has a bottom flange $l$ along its bottom edge which projects rearward and is secured to similar rearwardly projecting marginal flanges $m$ of the end frame portions $k$, and the top frame portion $i$ is also provided with a similar flange $n$ secured at its opposite extremities to the flanges $m$. The rear upwardly projecting securing arm portion $c$ of the brackets are each provided with a forwardly projecting angular portion $o$, the bottom surface of which angular portion is adapted to engage the top surface of the flange $l$ of the upright mirror frame, as shown in Fig. 2, and a back frame portion $p$, which may also be of metal, extends across the back of the mirror and is secured to the main mirror frame by securing clips $q'$. The member $p$ is provided with side flanges $q$ extending upward and downward along the opposite vertical edges of the mirror and between said edges and the rearwardly projecting flanges $m$ of the said frame members $h$. A channel is thus formed between the flanges $q$ and $m$, into which the upwardly projecting securing arm portions $c$ of the brackets extend. The upright arm portions $c$ of the brackets and the space or channel formed between the flange portions $q$ and $m$ are of such dimensions that said arm portions fit snugly between said flanges and the parts are thus rigidly braced and securely held together so as to form a rigid frame-work, comprising the upright mirror frame portion $h$ and the shelf-supporting bracket arm portions which are secured to and supported by the mirror frame and project forward beyond the same in position to form a rigid support for a shelf $r$.

Each of the forwardly projecting bracket arm portions $a$ is provided at or near its forward extremity with an upwardly projecting shelf-securing finger or lug $s$, which is by preference integral with the horizontal arm portion and extends above the top shelf-supporting surface of the latter. Each of these upwardly projecting fingers or lugs $s$ is provided with an angular top portion $t$ which extends over the top shelf-supporting surface portion of the corresponding horizontal bracket arm, and is provided with a space between said top angular portion $t$ and the top surface of the horizontal arm, adapted to admit a shelf $r$, which is by preference made of glass—between said angular top portion $t$ and the top of the main horizontal arm. The horizontal angular portion $o$ of the rear upwardly projecting arm of each bracket is provided with a space between said horizontal angular portion and the top or shelf-supporting surface of the corresponding bracket arm, adapted to admit the rear marginal portion $u$ of the shelf $r$ and the rearwardly projecting flange $l$ between said horizontal angular portion $o$ and said top shelf-supporting surface of the horizontal arm. (See Figs. 2 and 3.)

The bottom marginal edge of the upright mirror frame, which when the frame is formed of metal comprises the rearwardly projecting flange $l$, is thus in abutting engagement with the top surface and extends along the entire rear marginal portion of the shelf, so that the shelf is securely and rigidly held between the bottom edge of the upright mirror frame and the shelf-supporting bracket arms, thus forming a rigid frame for supporting the mirror and shelf and rigidly connecting all of the parts of the device. Upwardly projecting guards or lugs $v$ on the horizontal bracket arms $a$ project upwardly in engagement with the upper ends of the shelf and in position to prevent endwise movement of the same. The shelf is held against outward lateral movement by the upwardly projecting fingers $s$, and is securely and rigidly held in engagement with the top shelf-engaging surface portions of the arms $a$ by the top angular portions $t$ of the fingers $s$ and the bottom edge of the mirror frame and the means for connecting the mirror frame and brackets, already described. Each of the horizontal bracket arms $a$ is provided with a depending bar-supporting arm $w$, each of said arms having a socket or bar-engaging portion $y$ adapted to admit and securely hold the ends of a horizontal bar $z$ in operative position below the level of the shelf. The bar $z$ is secured in position by means of set screws 2, or other suitable securing means. The upright mirror frame $h$ is provided with apertures 3 adapted to admit screws or other suitable securing means, for securing the mirror to a wall or stationary support, and the depending bracket arm portions $b$ are also provided with apertures 4 adapted to admit screws or other securing means, for holding the lower portion of the device in position upon a support.

From the foregoing it will be seen that the upright mirror frame is rigidly secured to and adapted to form a support for the projecting brackets or bracket arms and the shelf mounted upon said arms, and that the shelf and upright mirror frame are secured in rigid engagement with each other, and that the shelf is rigidly secured in place in such a manner that all of the parts of the device, including the upright mirror frame, the shelf, bracket arms and horizontal bar $z$, form a rigid frame-work without the use of screws or other securing means extending through the shelf and without apertures in the shelf for admitting such securing means.

The advantages of this construction and manner of securing and holding a glass shelf in operative position and connecting the same with a mirror or mirror frame, whether the mirror frame be of wood or metal and particularly when the mirror frame is formed of metal, are readily apparent.

We claim:

1. In a device of the class described, the combination of a plurality of brackets each comprising in its construction a horizontal shelf-supporting arm, a rear upwardly projecting arm extending above the shelf-engaging top surface of each horizontal arm and adapted to be secured to a mirror frame, a shelf mounted upon the horizontal arms of said brackets, and a mirror frame secured to the rear upwardly projecting arms of the brackets and having its bottom edge in abutting engagement with the rear marginal top surface of the shelf and adapted to secure the engaged portion of the shelf between the bottom edge of the upright main mirror frame and the horizontal bracket arms, said mirror frame having vertical channels into which the said upwardly projecting arm portions of the brackets extend.

2. In a device of the class described, the combination of a plurality of brackets each comprising in its construction a horizontal shelf-supporting arm, a rear upwardly projecting angular arm integral with and extending above the shelf-engaging top surface of the horizontal arm of each of said brackets, respectively, said upwardly projecting arms each having a horizontal portion extending over and in parallel relation to the corresponding horizontal arm and provided with a space between said angular portion and said horizontal arm, a shelf mounted upon the top surfaces of the horizontal arms and having its rear edge extending beneath the angular portions of the rear angular upper arms of said brackets, and a mirror frame secured to the upwardly projecting rear arm portions of the bracket members and having a bottom flange extending between the angular portions of the rear upwardly projecting arms of the brackets and the rear edge of the shelf and in abutting engagement with the top surface of the shelf.

3. In a device of the class described, the combination of a plurality of brackets each comprising in its construction a horizontal shelf-supporting arm, a rear upwardly projecting angular arm extending above the shelf-engaging top surface of each horizontal arm, said upwardly projecting arm having a horizontal portion extending over the top rear surface portion of the corresponding horizontal arm and provided with a space between said angular portion and said horizontal arm, a shelf mounted upon the top surfaces of the horizontal arms and having its rear edge extending beneath the horizontal portions of the rear angular upper arms of said brackets, and a mirror frame secured to the upwardly projecting rear arm portions of the bracket members and having a bottom flange extending between the angular portions of the rear upwardly projecting arms of the brackets and the rear edge of the shelf and in abutting engagement with the top surface of the shelf, said mirror frame having vertical rear channels into which said upwardly projecting arms of the bracket members extend.

4. In a device of the class described, the combination of a plurality of brackets each comprising in its construction a horizontal shelf-supporting arm having a rear upwardly projecting angular arm extending above the shelf-engaging top surface of the horizontal arm, said upwardly projecting arm having a horizontal portion extending over the top rear surface portion of the horizontal arm and provided with a space between said angular portion and said horizontal arm, a front upwardly projecting finger on the horizontal arm of each bracket, each of said fingers having an angular top portion extending over the top surface of the horizontal arm and provided with a space between said angular portion and said top surface, a shelf mounted upon the top surfaces of the horizontal arms and having its front margin located beneath and in engagement with the angular top portions of said fingers, the rear edge of said shelf being in position to extend beneath the horizontal portions of said rear upwardly projecting angular arms of said brackets, and a mirror frame secured to the upwardly projecting rear arm portions of the bracket members and having a bottom flange extending between the angular portions of the rear upwardly projecting arms of the brackets and the rear edge of the shelf and in abutting engagement with the top surface of the shelf.

In testimony, that, we claim the foregoing as our invention we affix our signatures in the presence of two witnesses, this 20th day of February A. D. 1914.

HELEN KEARNS.
WILLIAM D. MARTIN.

Witnesses:
EUGENE C. WANN,
HARRY IRWIN CROMER.

Copies of this patent may be obtained for five cents each, by addressing the "Commissioner of Patents, Washington, D. C."